United States Patent
Mogilicherla et al.

(10) Patent No.: US 9,047,277 B2
(45) Date of Patent: Jun. 2, 2015

(54) SYSTEMS AND METHODS FOR SYNCHRONIZING HIERARCHICAL REPOSITORIES

(75) Inventors: Chandrashekar Mogilicherla, Warangal (IN); M. V. Jagannath Rao, New Delhi (IN); Mohit Gupta, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1302 days.

(21) Appl. No.: 12/338,578

(22) Filed: Dec. 18, 2008

(65) Prior Publication Data
US 2014/0250108 A1    Sep. 4, 2014

(51) Int. Cl.
*G06F 7/00* (2006.01)
*G06F 17/00* (2006.01)
*G06F 17/30* (2006.01)

(52) U.S. Cl.
CPC .................................... *G06F 17/30* (2013.01)

(58) Field of Classification Search
CPC .......... G06F 17/5022; G06F 17/30592; G06F 17/30572
See application file for complete search history.

(56) References Cited

U.S. PATENT DOCUMENTS

| | | | |
|---|---|---|---|
| 5,806,075 A * | 9/1998 | Jain et al. | 1/1 |
| 6,021,118 A * | 2/2000 | Houck et al. | 370/254 |
| 6,639,836 B1 * | 10/2003 | Hung et al. | 365/185.18 |
| 7,516,157 B2 * | 4/2009 | Cameron et al. | 1/1 |
| 2005/0273654 A1 * | 12/2005 | Chen et al. | 714/13 |
| 2006/0195449 A1 * | 8/2006 | Hunter et al. | 707/9 |
| 2007/0027887 A1 * | 2/2007 | Baldwin | 707/100 |
| 2007/0136396 A1 * | 6/2007 | Kulkarni et al. | 707/204 |
| 2007/0271317 A1 * | 11/2007 | Carmel | 707/204 |
| 2008/0005520 A1 * | 1/2008 | Siegwart et al. | 711/170 |
| 2008/0098453 A1 * | 4/2008 | Hinton et al. | 726/1 |
| 2008/0104277 A1 * | 5/2008 | Tian | 709/248 |
| 2008/0235300 A1 * | 9/2008 | Nemoto et al. | 707/204 |
| 2009/0083338 A1 * | 3/2009 | Evans et al. | 707/201 |
| 2009/0254579 A1 * | 10/2009 | Hazlewood et al. | 707/102 |
| 2010/0138385 A1 * | 6/2010 | Palermiti et al. | 707/610 |

* cited by examiner

*Primary Examiner* — Tony Mahmoudi
*Assistant Examiner* — Tuan A Pham
(74) *Attorney, Agent, or Firm* — Kilpatrick Townsend & Stockton LLP

(57) ABSTRACT

Systems and methods which implement synchronization across hierarchical targets by ordering elements in a hierarchical target in order of hierarchical depth and propagating a first set of element changes based upon the hierarchical order of elements and a second set of element changes based upon a non-hierarchical order of elements priority are shown. A child attribute data model is utilized with respect to hierarchical data structures for which synchronization is provided in which hierarchy relationships are represented as an attribute of the child according to embodiments.

33 Claims, 8 Drawing Sheets

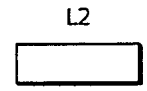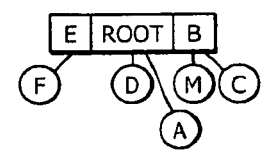

SYSTEMS AND METHODS FOR SYNCHRONIZING HIERARCHICAL REPOSITORIES

TECHNICAL FIELD

The disclosure relates generally to repositories maintaining elements in a hierarchical relationship and, more particularly, to providing synchronization of hierarchical relationships with respect to such repositories.

BACKGROUND OF THE INVENTION

The availability and use, of computers has become nearly ubiquitous in modern society. Computers, such as personal computers (PCs), are in wide use today in homes and businesses for information management tasks such as word processing, accounting, graphics, imaging, data management, communications, etc. Many computer based information management systems store, associate, present, and/or represent various elements (e.g., data files, file system folders, electronic communications, etc.) using a hierarchical data structure. Such hierarchical structures allow for logical grouping of the information, such as into several levels of files or folders. This hierarchical organization generally facilitates a user's easy access to specific desired data within a much larger data repository.

FIG. 1 is a diagram illustrating hierarchical data structure 110 as provided within repository 100. Such hierarchical data structures are often described as trees having various branches and leaf nodes. Because of the hierarchical nature, descriptors, such as parent, sibling, and children are used to describe the hierarchical relationship between the various files, folders, and nodes in the structure. Hierarchical data structure 110 includes two main branches represented by elements A and D, such as may comprise folders, files, etc. Elements A and D are in the top most hierarchy of hierarchical structure 110 (i.e., directly below the hierarchy root), they are siblings to each other. In association with these two top level elements are element B, which is a child of element A and element E, which is a child of element D. For example, element A and element D may comprise folders within which are element B and element E which are themselves folders, but still do not represent any actual data. The data in hierarchical data structure 110 is represented by element C and element M, which are children of element B, and element F, which is a child of element E. Continuing with the foregoing example, elements C, M, and F may comprise files within a respective one of elements B and E. Hierarchical data structure 110 may be organized such that particular elements, such as elements C and M, represent information of a much different nature than that of other elements, such as element F. Therefore, when reviewing hierarchical data structure 110 of the entire data repository, a user may easily bypass the entire branch of element D and proceed directly to the branch of element A to find the desired file.

Information for such repositories may be gathered and stored in various different manners and with various different devices, such as digital cameras, digital music players, a variety of computer applications, such as word processors, spread sheets, mobile phones, and the like. There may also be multiple repositories or instances of the same information. For example, music on a digital music player may exist on the player device and also on the user's computer. Photographs from a digital camera may exist on one or more of a user's computer and also in an online photo service. In networked environments, it may be beneficial to have a set of information stored on a networked or shared memory and also on a local memory, such that a user may be able to access the information either while logged onto the network or operating offline and possibly remote from the networked environment.

One of the functionalities or utilities that relates to the foregoing multiple data instances is synchronization. Synchronization is the process of making the data on one of the devices or networked locations equal to or synchronized with the data on the other device or network location. That is, synchronization is the act of keeping the state of a repository of elements consistent between two targets. Such targets are referred to herein as sync targets, wherein a sync target is an application that maintains a repository of elements facilitating a user add/delete/edit elements to/in the repository (e.g., PHOTOSHOP.COM™ online image editing application, PHOTOSHOP® ELEMENTS image editing software, etc.). Such sync targets may contain hierarchical data, such as within a hierarchical data structure as shown in FIG. 1, thereby providing hierarchical targets containing hierarchical data which needs to be synchronized.

An example of hierarchical targets is a list of albums in PHOTOSHOP.COM™ and PHOTOSHOP® ELEMENTS. Such an album hierarchy data structure can contain an album inside an album group wherein each element in the hierarchy can be independently edited/moved/deleted. If, for example, new data has been added to one of the hierarchical targets (e.g., added to a file in one of hierarchical targets), it should be correspondingly added to associated hierarchical targets (e.g., added to a corresponding file or files in the other hierarchical targets) as well if synchronization is to be maintained. Accordingly, it should be appreciated that synchronization of hierarchical targets involves synchronizing attributes of each element in the hierarchy as well as synchronizing relationships present in the hierarchy.

Providing synchronization with respect to hierarchical targets presents challenges both with respect to efficient operation and accurately maintaining synchronization. For example, implementing a "brute force" approach might propagate/commit changes across the hierarchical targets as each change is made. However, such an approach results in a lack of efficiency because multiple passes through the hierarchical data structures would be made for a series of changes (e.g., the hierarchy of elements would be computed multiple times to synchronize a plurality of changes). However, certain use cases present challenges when attempting to propagate/commit a plurality of changes in batch. For example, deletion of a parent element in a hierarchy (deletion of a parent implies deletion of all of its children) can present synchronization issues where the children elements of the deleted parent element were moved prior to the deletion.

BRIEF SUMMARY OF THE INVENTION

The present disclosure is directed to systems and methods which implement synchronization across hierarchical targets by ordering elements in a hierarchical target in order of hierarchical depth (e.g., ascending hierarchical order) and propagating a first set of element changes based upon the hierarchical order of elements and a second set of element changes based upon a non-hierarchical order of elements priority. Embodiments provide optimal and robust synchronization of hierarchical data structures such that element attributes and relationships it holds are propagated and committed simultaneously with respect to a hierarchical data structure.

In operation according to embodiments of the invention, a data model (referred to herein as a child attribute data model) is utilized with respect to hierarchical data structures for which synchronization is provided in which hierarchy relationships are represented as an attribute of the child. For example, such a child attribute data model may include a hierarchy attribute, P(Ei), with respect to each element, Ei, wherein P(Ei) represents "Parent of Element Ei" in the hierarchy. If the hierarchical target native data model does not store the elements using attributes consistent with the foregoing (e.g., the hierarchical target employs a custom or proprietary data structure), embodiments may nevertheless be implemented with respect to such hierarchical targets by generating an intermediate format having relationship attributes as described above. Utilizing the child attribute data model, embodiments order the elements in a hierarchical target in order of depth (e.g., ascending order of depth). Having the order of the elements of the hierarchical target, embodiments propagate a first set of changes based upon the hierarchical order of elements and a second set of element changes based upon a non-hierarchical order of elements priority set of changes in the hierarchy. For example, certain cases, such as adding and changing elements, may be propagated in the first set of element changes, whereas special cases, such as deletion of an element, may be propagated in the second set of element changes as a lowest priority change.

Synchronization provided according to the concepts herein is efficient and reliable, even when applied to hierarchical data structures wherein each element in the hierarchy can change independently. Such synchronization workflows may be encountered, for example, where offline and online organization paradigms are synchronized. For example, PHOTOSHOP.COM™ image editing web client application and PHOTOSHOP® ELEMENTS image editing software have a hierarchical album based organization, wherein each element can change independently, for which synchronization may be provided according to the concepts herein.

The foregoing has outlined rather broadly the features and technical advantages of embodiments in order that the detailed description that follows may be better understood. Additional features and advantages of embodiments will be described hereinafter which form the subject of the claims. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the concepts herein as set forth in the appended claims. The novel features which are believed to be characteristic of the concepts herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWING

For a more complete understanding of the present invention, reference is now made to the following descriptions taken in conjunction with the accompanying drawing, in which:

FIGS. 4A-4G show element lists at various points during operation of hierarchical depth order processing of embodiments;

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

Figure 2:
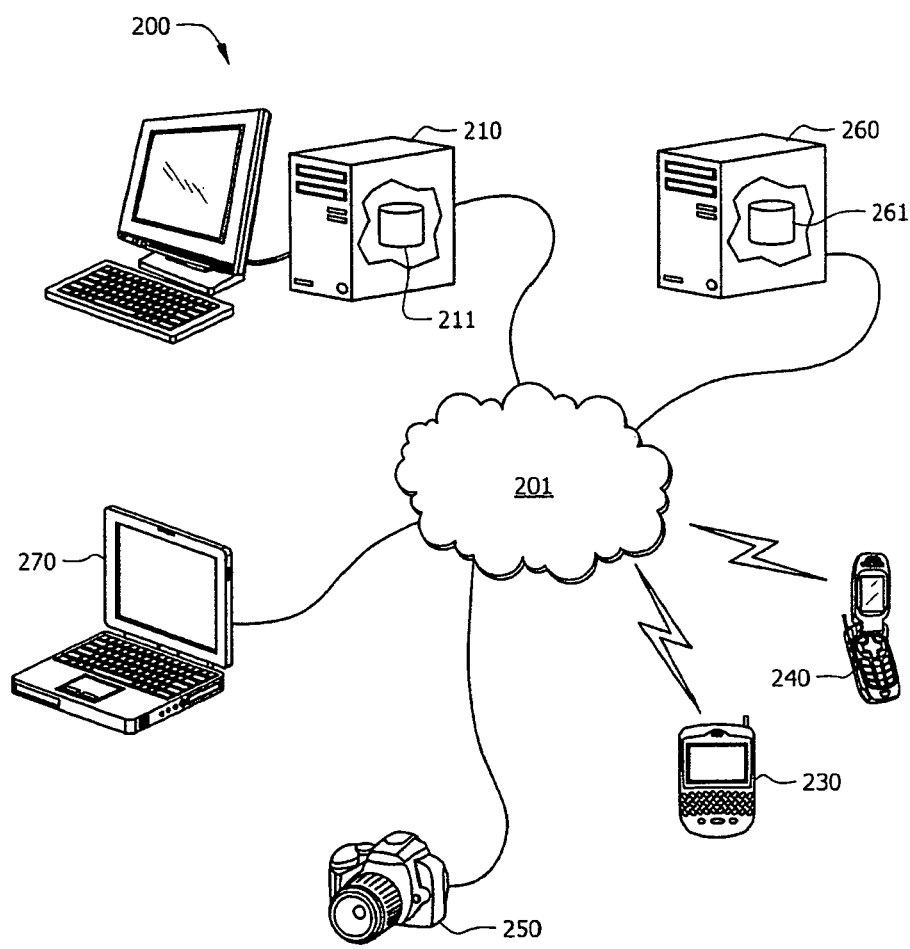
FIG. 2 shows a network system upon which embodiments herein may be implemented.

Directing attention to FIG. 2, network system 200 having a plurality of processor-based systems, shown as personal computer system 210, portable computer system 220, personal digital assistant (PDA) system 220, personal communication system (PCS) 240, camera 250, and server system 260, in communication via network 201, is shown. Network 201 may comprise a local area network (LAN), a metropolitan area network (MAN), a wide area network (WAN), an intranet, an extranet, the Internet, the public switched telephone network (PSTN), a wireless network, a cable transmission network, and/or the like.

It should be appreciated that the various processor-based systems of FIG. 2 may provide a plurality of platforms. For example, personal computer system 210, portable computer system 220, and server system 260 may operate under control of different operating systems, such as WINDOWS, MAC OS, LINUX, SOLARIS, UNIX, etc. Additionally, personal computer system 210 and portable computer system 220 may provide appreciably different processor and/or graphical rendering environments than PDA system 230, PCS 240, and camera system 250. Nevertheless, any or all of these processor-based systems, as well as other forms of processor-based systems not expressly illustrated, may be utilized for information management tasks such as word processing, accounting, graphics, imaging, data management, communications, etc.

Figure 1:
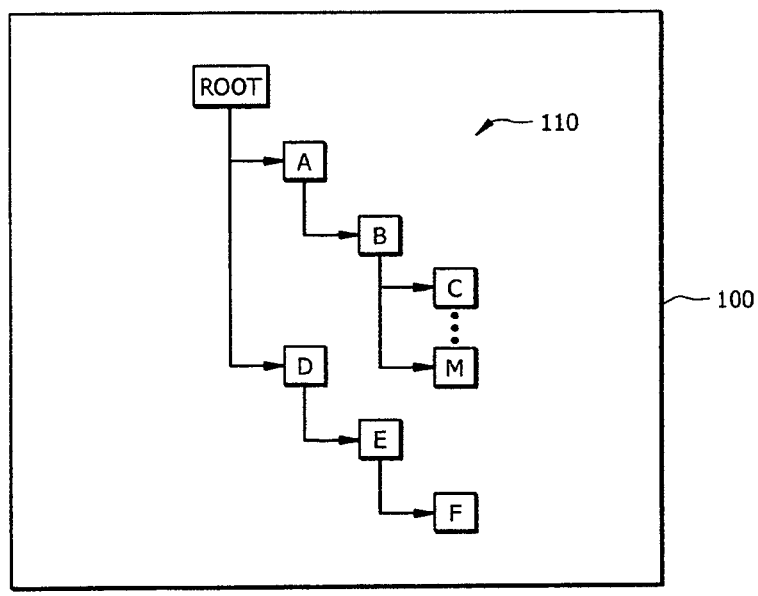
FIG. 1 shows a hierarchical data structure as may be synchronized according to embodiments.

In accordance with the concepts herein, one or more information management system is implemented with respect to any such processor-based systems to store, associate, present, and/or represent various elements (e.g., data files, file system folders, electronic communications, etc.) using a hierarchical data structure, such as hierarchical data structure 110 illustrated in FIG. 1. For example, personal computer system 210 may utilize image editing software (e.g., PHOTOSHOP® ELEMENTS) to create and manage a hierarchical album of photographs or other images as hierarchical data structure 211 stored locally thereto. Similarly, portable computer system 220 may utilize an image editing web client application (e.g., PHOTOSHOP.COM™) to create and manage a hierarchical album of photographs or other images as hierarchical data structure stored remotely by server system 260. It should be appreciated that hierarchical data structures may be stored remotely and/or locally with respect to any particular processor-based system depending upon available resources and the desired use model. For example, camera system 250 and PCS 240 may each have a hierarchical album of photographs or other images stored locally as originators of such information, whereas PDA system 230 may utilize a hierarchical album of photographs or other images stored remotely to conserve local memory resources.

Within network system 200, there may be multiple repositories or instances of the same information. For example, hierarchical data structure 211 may comprise a user's library of data (e.g., photographs or other images) stored on a home computer while hierarchical data structure 261 comprises the user's same library of data stored by an online service (e.g., online photo service). Because each such hierarchical data structure is to be a repository of the same information, it is desirable to provide synchronization between these hierarchical data structures, wherein synchronization operates to make the data on one of the devices or networked locations equal to or synchronized with the data on the another device or network location. Such synchronization of hierarchical targets involves synchronizing attributes of each element in the hierarchy as well as synchronizing relationships present in the hierarchy.

Through such synchronization, the state of hierarchical data structures is kept consistent between two or more hierarchical targets. If, for example, new data has been added to hierarchical data structure 211 (such as may be stored in a synchronization change log for propagation to associated hierarchical targets), synchronization would correspondingly add such data to hierarchical data structure 261, where hierarchical data structure 211 and hierarchical data structure 261 comprise a pair of synchronized hierarchical targets. Certain use cases, however, present challenges when attempting to propagate/commit a plurality of changes in batch. For example, deletion of a parent element in a hierarchy (deletion of a parent implies deletion of all of its children) can present synchronization issues where the children elements of the deleted parent element were moved prior to the deletion.

Figure 6:
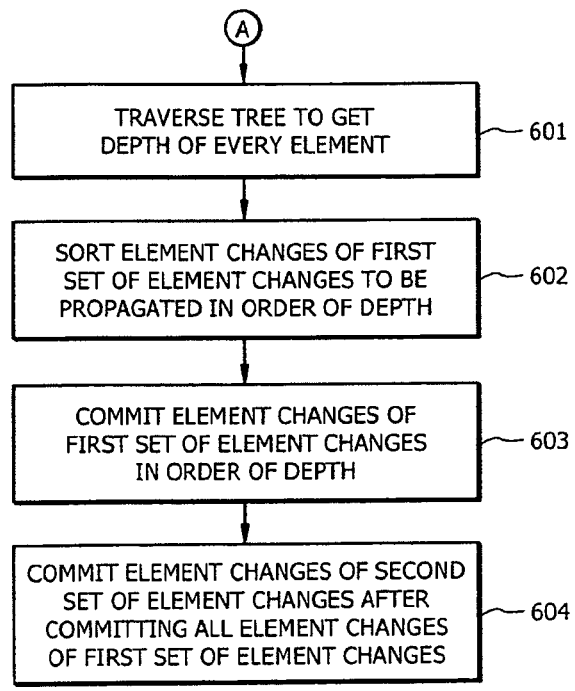
FIG. 6 shows a flow diagram of propagating a first set of changes based upon the hierarchical order of elements and a second set of element changes based upon a non-hierarchical order of elements according to an embodiment.

Accordingly, embodiments described herein implement synchronization across hierarchical targets by ordering elements in a hierarchical target in order of hierarchical depth (e.g., ascending hierarchical order) and propagating a first set of element changes based upon the hierarchical order of elements and a second set of element changes based upon a non-hierarchical order of elements priority. For example, embodiments utilize a child attribute data model to order the elements in a hierarchical target in order of depth (e.g., ascending order of depth), as set forth in detail in the discussion of FIG. 3 below. Having the order of the elements of the hierarchical target, embodiments propagate a first set of changes based upon the hierarchical order of elements and a second set of element changes based upon a non-hierarchical order of elements, as set forth in detail in the discussion of FIG. 6 below.

Figure 3:
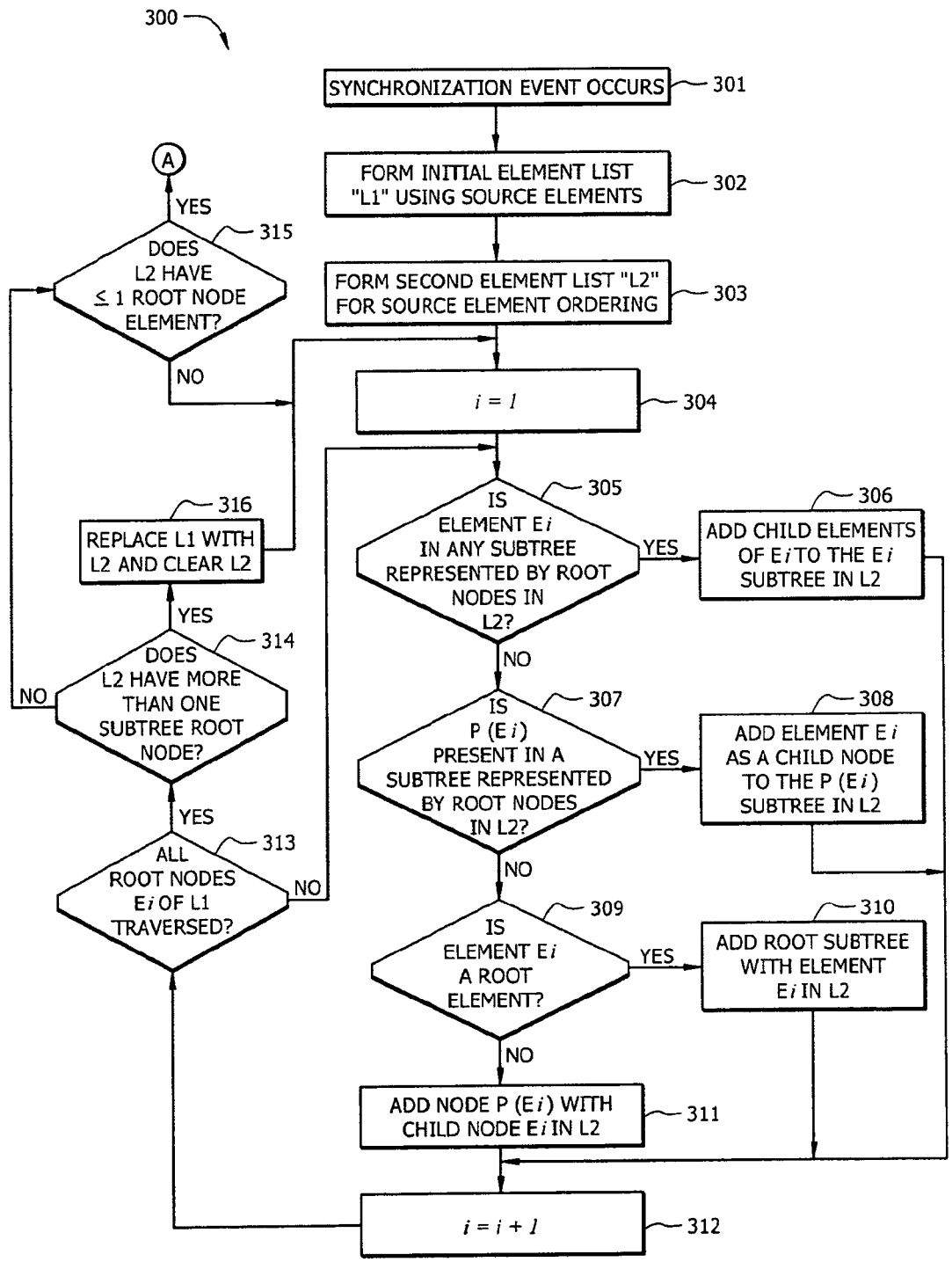
FIG. 3 shows a flow diagram of hierarchical depth order processing according to an embodiment.

Directing attention to FIG. 3, a flow diagram providing operation to utilize a child attribute data model to order the elements in a hierarchical target in order of depth according to the concepts herein is shown as flow 300. In order to aid in the understanding of the concepts herein, operation of flow 300 will be described with reference to synchronizing hierarchical data structure 211 and hierarchical data structure 261, and it will be assumed that the hierarchical data structure contained therein is as represented in hierarchical data structure 110 of FIG. 1. It should be appreciated, however, that the processes of flow 300 may be applied with respect to different hierarchical data structures, different numbers of hierarchical data structures, different processor-based systems, different numbers of processor-based systems, etc.

At block 301 of the illustrated embodiment a synchronization event occurs which initiates synchronization. For example, a user may have been working offline using personal computer system 210, wherein linking the personal computer system 210 with network 201 to again place personal computer system 210 online may provide a synchronization event to ensure all instances of related hierarchical targets (here hierarchical data structure 211 and hierarchical data structure 261) are in sync. Additionally or alternatively, a user having exited or otherwise completed an information management session using personal computer system 210 may provide a synchronization event to ensure all instances of related hierarchical targets are in sync. A user may manually initiate synchronization through manipulation of a user interface to cause all instances of related hierarchical targets are in sync. Of course, other techniques by which synchronization may be initiated may be utilized, if desired.

The illustrated embodiment of flow 300 utilizes a plurality of element lists, referred to herein as element lists L1 and L2, to iteratively derive the order of the elements of the source hierarchical target for use in propagating the changes to destination hierarchical targets (as used herein, a "source hierarchical target" is a hierarchical target having changes to be propagated to destination hierarchical targets, and "destination hierarchical targets" are hierarchical targets related to such source hierarchical targets as another instance of the data repository thereof). Accordingly, irrespective of how or why synchronization has been initiated, operation of the illustrated embodiment proceeds to block 302 wherein data with respect to a source hierarchical target is used to form an initial list of trees (as used herein, a "tree" represents the hierarchy and a "node" represent an element and its relationship to its children) containing all the elements of the source hierarchical target hierarchical data structure 211 as root nodes.

FIG. 4A shows element list L1 as formed at block 302 to include all elements of hierarchical data structure 211 of the source hierarchical target. Specifically, the initially formed element list L1 includes elements A-M which are initially included as root nodes (hierarchical depth order processing as discussed below will order the elements in the proper hierarchy). Elements A-M as provided in element list L1 of FIG. 4A are arranged in pseudo random order, such as may correspond to their storage in hierarchical target 211. Accordingly, it should be appreciated that flow 300 may be applied with respect to any ordering of the elements.

Each iteration of hierarchical depth order processing of the illustrated embodiment of flow 300 will traverse element list L1 formed at block 302 to determine the appropriate nodal relationship of each such element using a child attribute data model in which hierarchy relationships are represented as an attribute of the child. For example, a child attribute data model implemented according to embodiments includes a hierarchy child attribute, $P(E_i)$, with respect to each element, $E_i$, wherein $P(E_i)$ represents "Parent of Element Ei" in the hierarchy. Accordingly, if hierarchical data structure 211 does not store the elements using attributes using an appropriate child attribute data model (e.g., the source hierarchical target employs a custom or proprietary data structure), processing according to block 302 processes the hierarchical data structure to generate an intermediate format having relationship attributes of a child attribute data model stored in association with each element prior to forming element list L1.

At block 303 of the illustrated embodiment, element list L2 is formed for use in iteratively processing the elements to derive the order of hierarchical depth. As initially formed, element list L2 is empty of the actual source elements (elements A-M) as shown in FIG. 4A.

A root node counter, i, is initialized at block 304 of the illustrated embodiment. Such a root node counter is used with respect to traversing the elements of the source hierarchical target as set forth in element list L1 in each iteration of the hierarchical depth order processing of flow 300. Accordingly, a corresponding root node counter incrementing process, $i=i+1$, is provided at block 312 after hierarchical depth order processing blocks 305-311 for which iterative processing is provided.

The hierarchical depth order processing determinations of blocks 305, 307, and 309 and the hierarchical depth order processing actions of blocks 306, 308, 310, and 311 comprise iterative process blocks in the illustrated embodiment of flow 300. In operation, the hierarchical depth order processing actions of blocks 306, 308, 310, and 311 are applied as appropriate for each element of element list L1 in accordance with hierarchical depth order processing determinations made at blocks 305, 307, and 309. This application of the hierarchical depth order processing actions of blocks 306, 308, 310, and 311 as appropriate for each element of element list L1 in accordance with hierarchical depth order processing determinations made at blocks 305, 307, and 309 is performed iteratively to arrive at a final tree represents the hierarchical depth ordering of elements in the hierarchical data structure as described below.

Figure 4D:
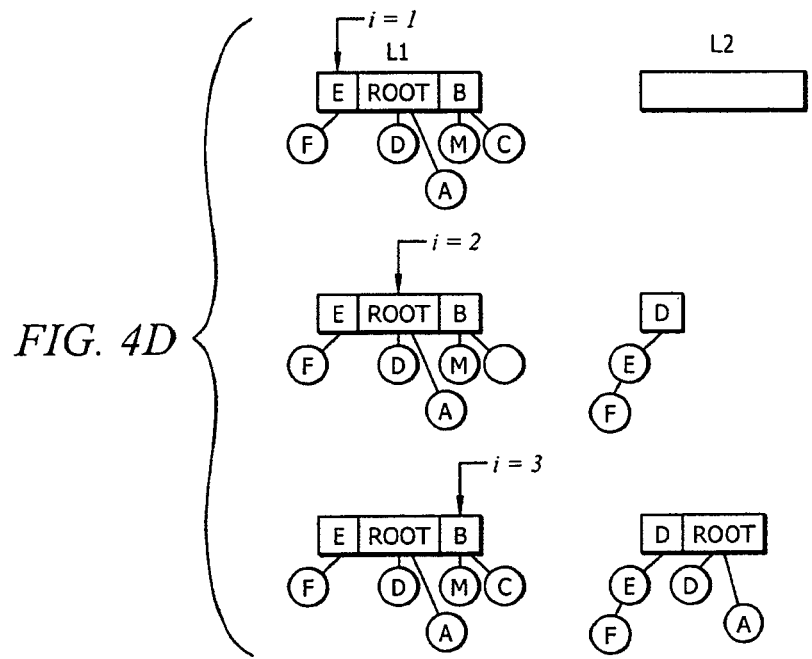
Figure 4E:
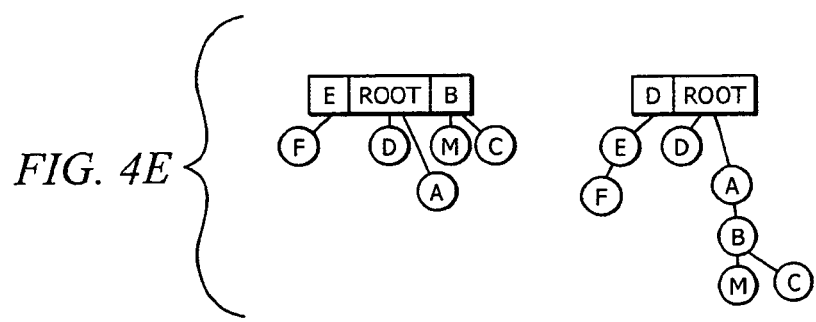
Figure 4F:
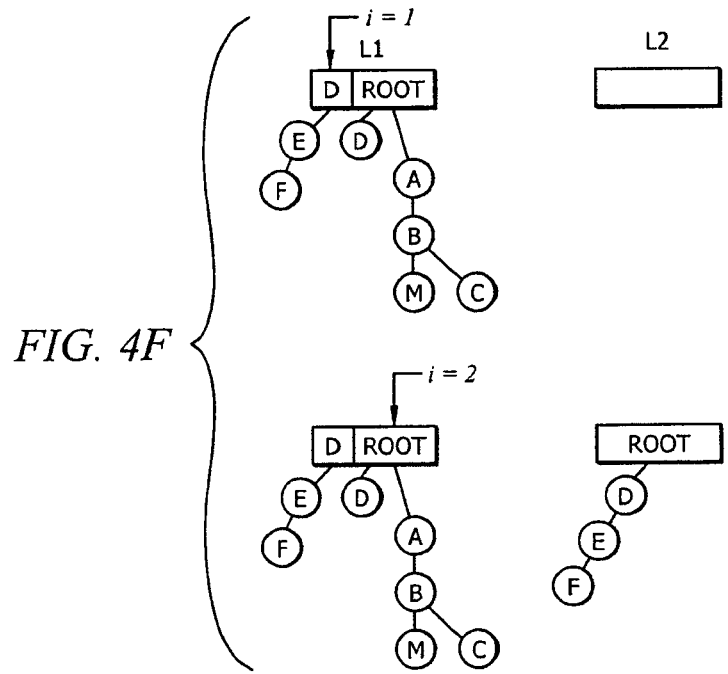
Figure 4G:
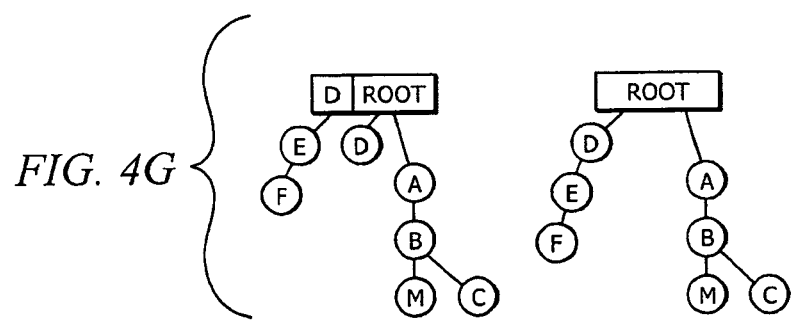

To aid in understanding the concepts herein, FIGS. 4B-4G show element lists L1 and L2 at various points during operation of flow 300 and will be referred to below with respect to the description of processing according to the illustrated embodiment of flow 300. Specifically, FIG. 4B shows a first iteration of hierarchical depth order processing, wherein the state of the element lists L1 and L2 are shown at the beginning of hierarchical depth order processing for each root node included in element list L1 (before processing of each of element list L1 root nodes F, E, D, M, C, B, and A by blocks 305-311). FIG. 4C shows the state of element lists L1 and L2 at the conclusion of the first iteration of hierarchical depth order processing (after processing of all of element list L1 root nodes F, E, D, M, C, B, and A by blocks 305-311). FIG. 4D shows a second iteration of hierarchical depth order processing, wherein the state of the element lists L1 and L2 are shown at the beginning of hierarchical depth order processing for each root node included in element list L1 (before processing of each of element list L1 root nodes E, Root, and B by blocks 305-311). FIG. 4E shows the state of element lists L1 and L2 at the conclusion of the second iteration of hierarchical depth order processing (after processing of all of element list L1 root nodes E, Root, and B by blocks 305-311). FIG. 4F shows a third iteration of hierarchical depth order processing, wherein the state of the element lists L1 and L2 are shown at the beginning of hierarchical depth order processing for each root node included in element list L1 (before processing of each of element list L1 root nodes D and Root by blocks 305-311). FIG. 4G shows the state of element lists L1 and L2 at the conclusion of the third, and final, iteration of hierarchical depth order processing (after processing of all of element list L1 root nodes D and Root by blocks 305-311).

Referring to row 401 of FIG. 4B (showing the state of element lists L1 and L2 at the beginning of hierarchical depth order processing for the first root node of element list L1), for the first root node of element list L1, element F, (referenced by root node counter i=1) a determination is made at block 305 (FIG. 3) as to whether element F is in a subtree represented by a root node in element list L2. As element list L2 is empty at this point as shown in row 401 of FIG. 4B, element F is not determined to be in a subtree represented by a root node in L2. Accordingly, processing according to the illustrated embodiment proceeds to block 307.

At block 307, a determination is made as to whether the parent of element F (as provided by the child attribute data model, wherein P(F)=E) is present in a subtree represented by a root node in element list L2. Again, as shown in row 401 of FIG. 4B element list L2 is empty at this point, thus the parent of element F is not determined to be in a subtree represented by root nodes in element list L2. Accordingly, processing according to the illustrated embodiment proceeds to block 309.

At block 309, a determination is made as to whether element F is a root element (i.e., an element with no parent in the hierarchical data structure). Element F has a parent, element E, and thus element F is not determined to be a root element. Accordingly, processing according to the illustrated embodiment proceeds to block 311.

At block 311, a root node comprising the parent of element F, here element E (P(F)=E), with a child node of element F is added to element list L2. Thereafter, processing according to the illustrated embodiment proceeds to block 312 wherein the root node counter is incremented to apply hierarchical depth order processing of this iteration to a next root node of element list L1.

At block 313 of the illustrated embodiment, a determination is made as to whether a all root nodes in element list L1 have been traversed. Here, elements E, D, M, C, B, and A remain to be traversed. Thus processing according to the illustrated embodiment returns to block 305.

Referring now to row 402 of FIG. 4B (showing the state of element lists L1 and L2 at the beginning of hierarchical depth order processing for the second root node of element list L1), for the second root node of element list L1, element E, (referenced by root node counter i=2) a determination is made at block 305 (FIG. 3) as to whether element E is in a subtree represented by a root node in element list L2. As element list L2 was updated to include a root node element E having a child node element F previously, processing proceeds to block 306 of the illustrated embodiment.

At block 306, any known child elements of element F (subtrees of root node element F present in element list L1) are added to the subtree which includes element F in element list L2. In the present example, there are no such known child elements of element F. Thereafter, processing according to the illustrated embodiment proceeds to block 312 wherein the root node counter is incremented to apply hierarchical depth order processing of this iteration to a next root node of element list L1.

At block 313 of the illustrated embodiment, a determination is again made as to whether a all root nodes in element list L1 have been traversed. Here, elements D, M, C, B, and A remain to be traversed. Thus processing according to the illustrated embodiment again returns to block 305.

Referring now to row 403 of FIG. 4B (showing the state of element lists L1 and L2 at the beginning of hierarchical depth order processing for the third root node of element list L1), for the third root node of element list L1, element D, (referenced by root node counter i=3) a determination is made at block 305 (FIG. 3) as to whether element D is in a subtree represented by a root node in element list L2. As shown in row 403 of FIG. 4B, element D is not in a subtree represented by a root node in L2. Accordingly, processing according to the illustrated embodiment proceeds to block 307.

At block 307, a determination is made as to whether the parent of element D (as provided by the child attribute data model, wherein P(D)=null) is present in a subtree represented by a root node in element list L2. Element D in this example has no parent. Accordingly, processing according to the illustrated embodiment proceeds to block 309.

At block 309, a determination is made as to whether element D is a root element (i.e., an element with no parent in the hierarchical data structure, wherein in the child attribute data model P(D)=null). As element D has no parent, processing according to the illustrated embodiment proceeds to block 310.

At block 310, a root subtree is added to element list L2 having element D as a child node. Thereafter, processing according to the illustrated embodiment proceeds to block 312 wherein the root node counter is incremented to apply hierarchical depth order processing of this iteration to a next root node of element list L1.

At block 313 of the illustrated embodiment, a determination is again made as to whether a all root nodes in element list L1 have been traversed. Here, elements M, C, B, and A remain to be traversed. Thus processing according to the illustrated embodiment returns to block 305.

Referring now to row 404 of FIG. 4B (showing the state of element lists L1 and L2 at the beginning of hierarchical depth order processing for the fourth root node of element list L1), for the fourth root node of element list L1, element M, (referenced by root node counter i=4) a determination is made at block 305 (FIG. 3) as to whether element M is in a subtree represented by a root node in element list L2. As shown in row 404 of FIG. 4B, element M is not in a subtree represented by a root node in L2. Accordingly, processing according to the illustrated embodiment proceeds to block 307.

At block 307, a determination is made as to whether the parent of element M (as provided by the child attribute data model, wherein P(M)=B) is present in a subtree represented by a root node in element list L2. As shown in row 404 of FIG. 4B, the parent of element M is not in a subtree represented by root nodes in element list L2. Accordingly, processing according to the illustrated embodiment proceeds to block 309.

At block 309, a determination is made as to whether element M is a root element (i.e., an element with no parent in the hierarchical data structure). Element M has a parent, element B, and thus element M is not determined to be a root element. Accordingly, processing according to the illustrated embodiment proceeds to block 311.

At block 311, a root node comprising the parent of element M, here element B (P(M)=B), with a child node of element M is added to element list L2. Thereafter, processing according to the illustrated embodiment proceeds to block 312 wherein the root node counter is incremented to apply hierarchical depth order processing of this iteration to a next root node of element list L1.

At block 313 of the illustrated embodiment, a determination is made as to whether a all root nodes in element list L1 have been traversed. Here, elements C, B, and A remain to be traversed. Thus processing according to the illustrated embodiment again returns to block 305.

Referring to now to row 405 of FIG. 4B (showing the state of element lists L1 and L2 at the beginning of hierarchical depth order processing for the fifth root node of element list L1), for the fifth root node of element list L1, element C, (referenced by root node counter i=5) a determination is made at block 305 (FIG. 3) as to whether element C is in a subtree represented by a root node in element list L2. As shown in row 405 of FIG. 4B, element C is not in a subtree represented by a root node in L2. Accordingly, processing according to the illustrated embodiment proceeds to block 307.

At block 307, a determination is made as to whether the parent of element C (as provided by the child attribute data model, wherein P(C)=B) is present in a subtree represented by a root node in element list L2. As shown in row 405 of FIGURE B, element B is in a subtree represented by a root node in element list L2 (here the root node is element B). Accordingly, processing according to the illustrated embodiment proceeds to block 308.

At block 308, element C is added as a child node to element B in the subtree in element list L2. That is, in addition to element M being included as a child element in the subtree in which element B appears in element list L2, element C is also included as a child element in the subtree.

Thereafter, processing according to the illustrated embodiment proceeds to block 312. At block 312, the root node counter is incremented to apply hierarchical depth order processing of this iteration to a next root node of element list L1.

At block 313 of the illustrated embodiment, a determination is again made as to whether a all root nodes in element list L1 have been traversed. Here, elements B and A remain to be traversed. Thus processing according to the illustrated embodiment returns to block 305.

Referring to row 406 of FIG. 4B (showing the state of element lists L1 and L2 at the beginning of hierarchical depth order processing for the sixth root node of element list L1), for the sixth root node of element list L1, element B, (referenced by root node counter i=6) a determination is made at block 305 (FIG. 3) as to whether element B is in a subtree represented by a root node in element list L2. As shown in row 406 of FIGURE B, element B is in a subtree represented by a root node in element list L2 (here the root node is element B). Accordingly, processing according to the illustrated embodiment proceeds to block 306.

At block 306, any known child elements of element B (subtrees of root node element B present in element list L1) are added to the subtree which includes element B in element list L2. In the present example, there are no such known child elements of element B which are not already part of the subtree which includes element B. Accordingly, processing according to the illustrated embodiment proceeds to block 312 wherein the root node counter is incremented to apply hierarchical depth order processing of this iteration to a next root node of element list L1.

At block 313 of the illustrated embodiment, a determination is again made as to whether a all root nodes in element list L1 have been traversed. Here, element A remains to be traversed. Thus processing according to the illustrated embodiment again returns to block 305.

Referring now to row 407 of FIG. 4B (showing the state of element lists L1 and L2 at the beginning of hierarchical depth order processing for the seventh root node of element list L1), for the third root node of element list L1, element A, (referenced by root node counter i=7) a determination is made at block 305 (FIG. 3) as to whether element A is in a subtree represented by a root node in element list L2. As shown in row 407 of FIG. 4B, element A is not in a subtree represented by a root node in L2. Accordingly, processing according to the illustrated embodiment proceeds to block 307.

At block 307, a determination is made as to whether the parent of element A (as provided by the child attribute data model, wherein P(D)=null) is present in a subtree represented by a root node in element list L2. Element A in this example has no parent. Accordingly, processing according to the illustrated embodiment proceeds to block 309.

At block 309, a determination is made as to whether element A is a root element (i.e., an element with no parent in the hierarchical data structure, wherein in the child attribute data model P(D)=null). As element A has no parent, processing according to the illustrated embodiment proceeds to block 310.

At block 310, element A is added to the Root subtree as a child node. Thereafter, processing according to the illustrated embodiment proceeds to block 312 wherein the root node counter is incremented to apply hierarchical depth order processing of this iteration to a next root node of element list L1.

At block 313 of the illustrated embodiment, a determination is again made as to whether a all root nodes in element list L1 have been traversed. Here, no elements remain to be traversed. Thus processing according to the illustrated embodiment proceeds to processes (shown as blocks 314 and 315) for determining if further iterations of the hierarchical depth order processing are to be performed or if the hierarchical depth order of hierarchical data structure 211 has been fully developed. Specifically, if the element list derived by the hierarchical depth order processing comprises more than one subtree root node (block 314), the hierarchical depth order processing is determined not to be complete because the elements have not been arranged in a structure with a single root. If element list L2 has one subtree root node and less than or equal to one root node element (block 315), then flow 300 of the illustrated embodiment determines that hierarchical depth order processing is complete (i.e., the hierarchical depth order of the elements has been developed).

Continuing with the foregoing example, a determination is made at block 314 as to whether element list L2 includes more than one root node according to the illustrated embodiment of flow 300. Referring to FIG. 4C (showing the state of element lists L1 and L2 at the conclusion of the above described first iteration of hierarchical depth order processing), element list L2 includes more than one root node. Accordingly processing according to the illustrated embodiment proceeds to block 316.

At block 316 of the illustrated embodiment, element list L1 is replaced with element list L2 and element list L2 is cleared. Operation in accordance with block 316 is illustrated by the element lists as shown in FIG. 4C (showing the state of element lists L1 and L2 at the conclusion of the above described first iteration of hierarchical depth order processing) and the first row of FIG. 4D (showing the state of element lists L1 and L2 at the beginning of hierarchical depth order processing for the first root node of element list L1 in a second iteration of hierarchical depth order processing). Thereafter, processing according to the illustrated embodiment again proceeds to block 304 for a second iteration of hierarchical depth order processing consistent with that described above with respect to the first iteration of hierarchical depth order processing.

Having described in detail above processing according to flow 300 for a first iteration of hierarchical depth order processing, one of ordinary skill in the art will readily appreciate how flow 300 of the illustrated embodiment would provide processing of subsequent iterations. To aid in this understanding, FIG. 4D shows the state of the element lists L1 and L2 at the beginning of hierarchical depth order processing for each root node included in element list L1 in a second iteration of hierarchical depth order processing and FIG. 4E shows the state of element lists L1 and L2 at the conclusion of this second iteration of hierarchical depth order processing. Similarly, FIG. 4F shows the state of the element lists L1 and L2 at the beginning of hierarchical depth order processing for each root node included in element list L1 in a third iteration of hierarchical depth order processing and FIG. 4G shows the state of element lists L1 and L2 at the conclusion of this third iteration of hierarchical depth order processing.

In the foregoing example, hierarchical depth order processing is complete after the third iteration. Specifically, referring to FIG. 4G, it can be seen that element list L2 does not have more than one subtree root node (block 314 of FIG. 3) and element list L2 has one root node element (block 315). Accordingly, flow 300 determines that hierarchical depth order processing provided thereby is complete (i.e., further iterations of hierarchical depth order processing are not to be performed) and that the hierarchical depth order tree of the elements has been developed as set forth in element list L2.

Figure 5A:
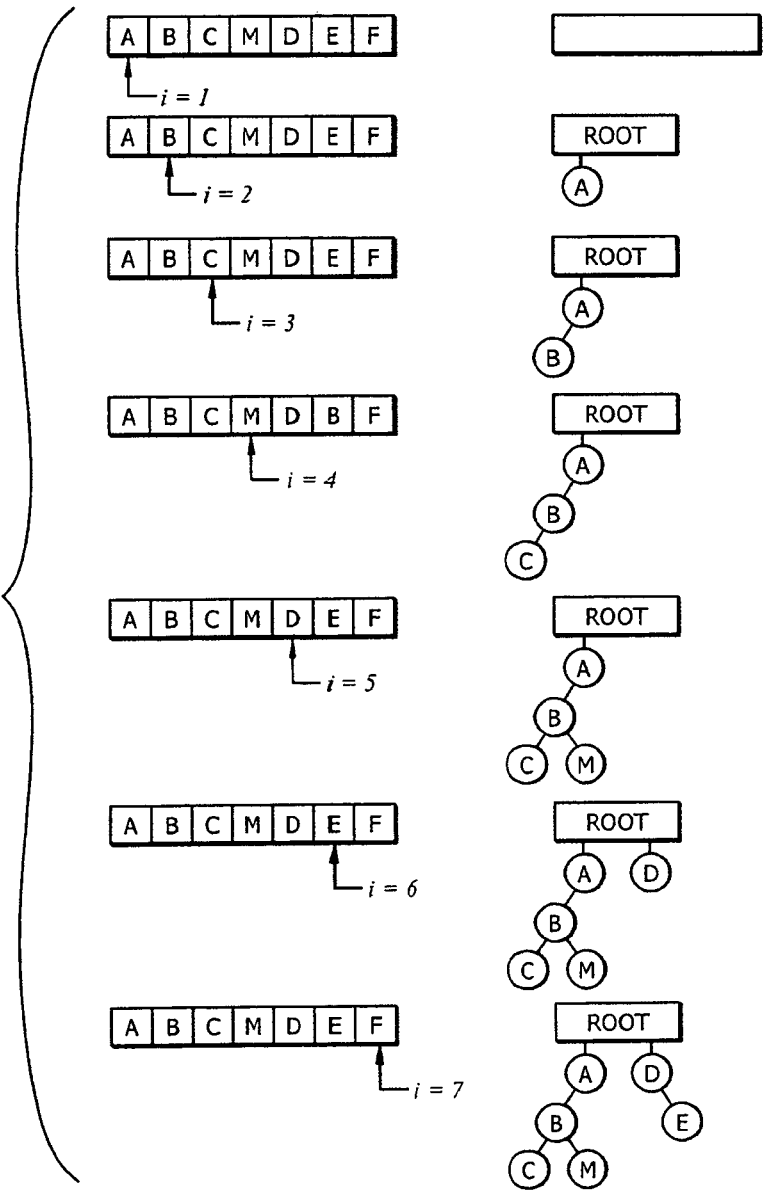
FIGS. 5A and 5B show element lists at various points during operation of hierarchical depth order processing of embodiments.
Figure 5B:
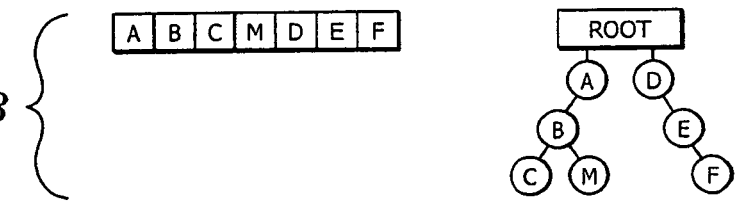

As previously mentioned, flow 300 may be applied with respect to any ordering of the elements, and thus is not limited to the order of elements shown in FIGS. 4A-4G. FIGS. 5A and 5B show hierarchical depth order processing according to flow 300 of the illustrated embodiment wherein an order of elements different than that of FIGS. 4A-4G is shown. It should be appreciated that the particular ordering of the elements may, however, result in a different number of iterations of the hierarchical depth order processing according to embodiments. For example, hierarchical depth order processing of flow 300 is completed in a single iteration for the order of elements in FIGS. 5A and 5B, as can be seen by element list L2 in FIG. 5B.

Once the hierarchical depth order tree is constructed according to embodiments, processing for propagating a first set of element changes based upon the hierarchical order of elements and a second set of element changes based upon a non-hierarchical order of elements priority is provided. Accordingly, processing according to the illustrated embodiment proceeds to flow 600 of FIG. 6 providing propagation of element changes to the elements of hierarchical data structure 211 to the elements of hierarchical data structure 261.

Element changes propagated according to embodiments herein are divided into a plurality of sets of element changes. For example, a first set of element changes may be identified for use in propagating element changes based upon the hierarchical order of elements and a second set of element changes identified for use in propagating element changes based upon a non-hierarchical order of elements priority. Accordingly, element changes determined to present issues when propagating a plurality of element changes in batch may be identified with a second set of element changes, thereby providing a first set of element changes encompassing other element changes. For example, deletion of a parent element in a hierarchy (deletion of a parent implies deletion of all of its children) can present synchronization issues where the children elements of the deleted parent element were moved prior to the deletion.

In order to understand how the delete use case presents issues when propagating a plurality of element changes, consider a case where an element A which had a child element B is being deleted after moving element B to be a child of another element C. In this case, if the order is to commit change on element A before the change on element B, element B will be deleted as it is a child element of element A. However, identifying deleting elements in a second set of element changes for propagation in accordance with the concepts herein gives lower priority to such delete changes. As will appreciated by the discussion which follows, by the time change on element A gets committed, element B is no longer a child of element A when committing the element changes using a plurality of sets of element changes as described herein. Accordingly, an embodiment includes deletion within the aforementioned second set of element changes and element changes such as adding, moving, editing, etc. within the aforementioned first set of element changes.

Referring again to FIG. 6, at block 601 the hierarchical depth order tree (developed by flow 300 of FIG. 3) is traversed (e.g., in O(log N) time) to get the depth of every element in the tree for use in propagating element changes to the elements of destination hierarchical targets. For example, continuing with the foregoing example, a hierarchical depth order tree as represented by element list L2 of FIGS. 4G and 5B may be traversed to get the depth of every element therein for propagating element changes to the elements of hierarchical data structure 261.

At block 602 of the illustrated embodiment, the depth of elements information is used to sort the element changes, or at least element changes of a first set of element changes, for each element in order of depth for propagating the changes to destination hierarchical targets. For example, element changes made with respect to hierarchical data structure 211, such as may be stored in a synchronization change log associated therewith, may be ordered in ascending order of depth for propagating the changes to the elements of hierarchical data structure 261 (depth being measured by the length of the path from root to node).

The element changes of a first set of element changes are committed (made) with respect to one or more destination hierarchical data structures in the order of depth at block 603. Continuing with the foregoing example, changes involving adding, moving, and/or editing elements are made to the elements of hierarchical data structure 261 in the order of depth of the elements to which the changes pertain. For example, any changes involving adding, moving, and editing elements D and A may be made (it being appreciated that these elements have the same hierarchical depth order), followed by any changes involving adding, moving, and editing elements E and B (it being appreciated that these elements also have the same hierarchical depth order), and followed by any changes involving adding, moving, and editing elements F, M, and C (it being appreciated that these elements also have the same hierarchical depth order).

In accordance with the foregoing example, a parent element change is committed before child element. Changes regarding the relation between child and parent elements can be established at the time committing changes on child element, thereby accomplishing all element changes of the first set in one pass.

At block 604, having completed propagation of the element changes of the first set of element changes, the illustrated embodiment commits (makes) element changes of a second set of element changes with respect to one or more destination hierarchical data structures. Accordingly, the element changes of the second set of element changes are made based upon a non-hierarchical order of elements priority. Continuing with the foregoing example, changes involving deleting elements are made to the elements of hierarchical data structure 261 after all changes involving adding, moving, and editing the elements of hierarchical data structure 261. For example, any changes involving deleting any of elements A-M may be made in any order.

Figure 7:
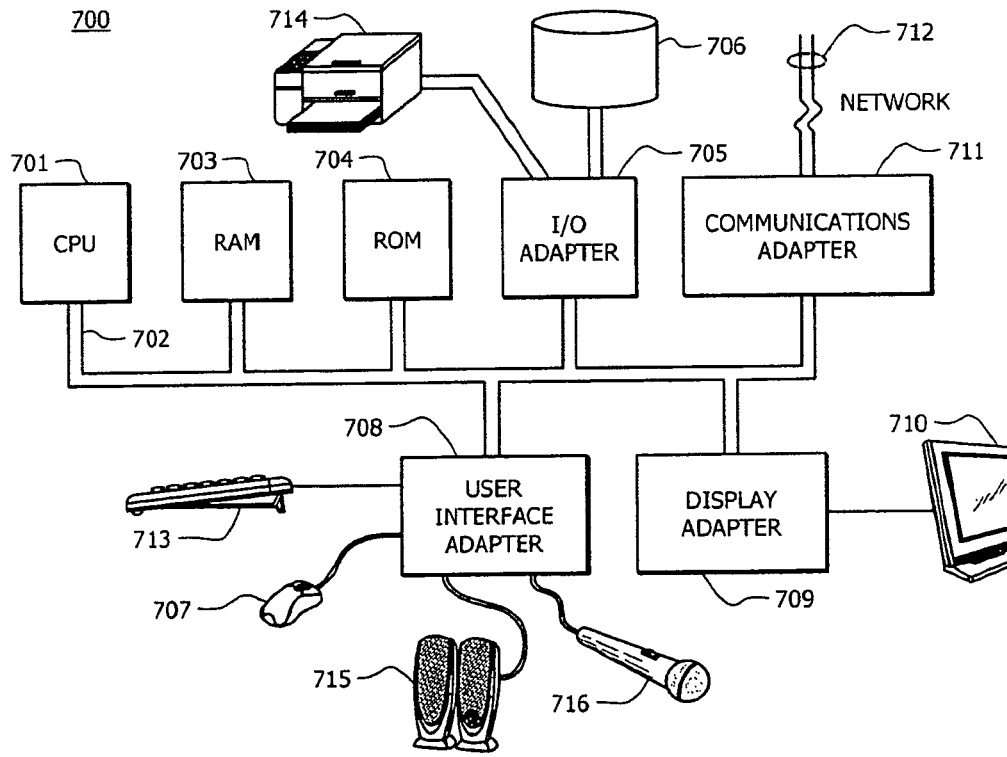
FIG. 7 shows detail with respect to processor-based systems upon which embodiments may be implemented.

FIG. 7 illustrates processor-based system 700, such as may comprise any of the processor-based systems of FIG. 2, adapted for use according to an embodiment. Processor-based system 700 of the illustrated embodiment includes central processing unit (CPU) 701 coupled to system bus 702. CPU 701 may be any general purpose CPU, such as a processor from the PENTIUM family of processors available from Intel Corporation or a processor from the POWERPC family of processors available from the AIM alliance (Apple Inc., International Business Machines Corporation, and Motorola Inc.). However, the present concepts are not restricted by the architecture of CPU 701 as long as CPU 701 supports the inventive operations as described herein.

Bus 702 of the illustrated embodiment is coupled to random access memory (RAM) 703, such as may comprise static random access memory (SRAM), dynamic random access memory (DRAM), synchronous dynamic random access memory (SDRAM), flash memory, and/or the like. Read only memory (ROM) 704, such as may comprise programmable read only memory (PROM), erasable programmable read only memory (EPROM), electrically erasable programmable read only memory (EEPROM), and/or the like, is also coupled to bus 702 of the illustrated embodiment. RAM 703 and ROM 704 hold user and system data and programs as is well known in the art and/or may provide repositories for the hierarchical data structures herein. Bus 702 is also coupled to input/output (I/O) controller 705, communications adapter 711, user interface adapter 708, and display adapter 709.

I/O controller 705 connects to storage device 706, such as may comprise one or more of a hard disk, an optical disk (e.g., compact disk (CD) or digital versatile disk (DVD)), a floppy disk, and a tape, to the processor-based system. Storage device 706 may provide a repository for the hierarchical data structures herein. I/O controller 705 of the illustrated embodiment is also connected to printer 714, which would allow the system to print information such as documents, photographs, etc. Such a printer may be a traditional printer (e.g. dot matrix, laser, etc.), a fax machine, a copy machine, and/or the like.

Communications adapter 711 is adapted to couple processor-based system 700 to network 712 to provide communications to and/or from external systems, devices, networks, etc. Network 712 of embodiments corresponds to network 301 of FIG. 3.

User interface adapter 708 of the illustrated embodiment couples various user input devices to the processor-based system. For example, keyboard 713, pointing device 707, and microphone 716 may be coupled through user interface adapter to accept various forms of user input. Similarly, speakers 715 may be coupled through user interface adapter to provide user interface output.

The display adapter 709 provides an interface to display 710. Accordingly, CPU 701 may control display of various information, including text, graphics, and images upon display 710 through display adapter 709. Display 710 may comprise a cathode ray tube (CRT) display, a plasma display, a liquid crystal display (LCD), a projector, and/or the like. Although not expressly shown in the illustrated embodiment, display 710 may provide for input of data as well as output of data. For example, display 710 may comprise a touch screen display according to embodiments.

When implemented in software, elements of embodiments are essentially code segments operable upon a processor-based system, such as processor-based system 700, to perform the necessary tasks. The program or code segments can be stored in a computer readable medium, such as RAM 703, ROM 704, and/or storage device 706. Additionally or alternatively, the code segments may be downloaded via computer networks, such as network 712.

Although embodiments have been described herein with reference to photographs or other images, it should be appreciated that the concepts herein may be applied with respect to hierarchical data structures comprising information in addition to or in the alternative to photographs or other image. For example, embodiments may be implemented with respect to electronic mail or other communications, music files or other digital records, business records or other electronic documents, etc.

Although concepts and their advantages have been described in detail, it should be understood that various changes, substitutions and alterations can be made herein without departing from the spirit and scope of the concepts herein as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present concepts. Accordingly, the appended claims are intended to include within their scope such processes, machines, manufacture, compositions of matter, means, methods, or steps.

What is claimed is:

1. A method comprising:
   establishing, by a processor in communication with a memory, a source hierarchical target and a destination hierarchical target;
   receiving, by the processor, a plurality of changes of one or more source elements of the source hierarchical target;
   traversing elements of a source element list, the source element list comprising the one or more source elements of the source hierarchical target, and, for each traversed source element, determining hierarchy child attributes of the traversed source element;
   copying the elements of the source element list to a destination element list in accordance with the hierarchy child attributes;
   propagating, by the processor, a first set of changes of the plurality of changes to a first set of elements of the destination hierarchical target, the first set of elements represented in the destination element list, and the propagating according to a sort order of changes to the first set of elements, the sort order based on hierarchical depths of the first set of elements in the destination element list; and
   propagating a second set of changes the plurality of changes to a second set of elements represented in the destination hierarchical target, the propagating according to a non-hierarchical order of the second set of elements in the destination element list.

2. The method of claim 1, wherein at least another portion of the changes made with respect to the elements of the source hierarchical target are propagated to respective elements of the destination hierarchical target during the propagating after the at least a portion of the changes are propagated in the hierarchical depth order of the elements.

3. The method of claim 2, wherein the at least a portion of the changes that are propagated in the hierarchical order of the elements comprise at least one of adding an element, changing an element, and moving an element within a hierarchical data structure, and wherein the at least another portion of the changes that are propagated after the at least a portion of the changes are propagated in the hierarchical depth order of the elements comprise deleting an element.

4. The method of claim 1, wherein traversing the elements of the source list comprises analyzing, by the processor, the elements of the source hierarchical target to provide the hierarchical depth order of the elements.

5. The method of claim 4, wherein the analyzing elements to provide the hierarchical depth order of the elements comprises:
   analyzing, by the processor, the hierarchy child attributes stored in association with elements of the source hierarchical target.

6. The method of claim 5, wherein the hierarchy child attributes of respective elements of the source hierarchical target comprise information with respect to a parent element of the respective element.

7. The method of claim 5, wherein the analyzing comprises iteratively deriving the hierarchical depth order of the elements through reference to the hierarchy child attributes.

8. The method of claim 7, wherein the iteratively deriving further comprises:
   creating, by the processor, the source element list initially containing all elements of the source hierarchical target;
   creating, by the processor, the destination element list initially containing no elements of the source hierarchical target; and
   adding, by the processor, elements to the destination element list from the source first list in accordance with the hierarchy child attributes.

9. The method of claim 8, wherein the iteratively deriving comprises:
   replacing the source element list with the destination element list and emptying the destination element list of all elements prior to initiating a next iteration of the iteratively deriving.

10. The method of claim 1, further comprising:
    determining, by the processor, the hierarchical depth order of elements of the source hierarchical target.

11. The method of claim 10, wherein the determining the hierarchical depth order of elements comprises:
    analyzing, by the processor, hierarchy child attributes stored in association with elements of the source hierarchical target.

12. The method of claim 11, wherein the hierarchy child attributes comprise information with respect to a parent element of an element the attribute is stored in association with.

13. The method of claim 11, wherein the determining comprises iteratively deriving the hierarchical depth order of the elements through reference to the hierarchy child attributes.

14. The method of claim 13, wherein the iteratively deriving comprises:
creating, by the processor, the source element list initially containing all elements of the source hierarchical target;
creating, by the processor, the destination element list initially containing no elements of the source hierarchical target; and
adding, by the processor, elements to the destination element list from the source element list in accordance with the hierarchy child attributes.

15. The method of claim 14, wherein the iteratively deriving further comprises:
replacing, by the processor, the source element list with the destination element list and emptying the destination element list of all elements prior to initiating a next iteration of the iteratively deriving.

16. The method of claim 1, wherein the hierarchical depth order of elements comprises a tree and node hierarchical data structure, and wherein the propagating the first set of element changes based upon the hierarchical depth order of elements propagates the element changes in ascending hierarchical order.

17. The method of claim 1, wherein the first set of element changes comprise at least one of adding an element, changing an element, and moving an element within a hierarchical data structure, and wherein the second set of element changes comprise deleting an element.

18. The method of claim 1, wherein traversing the elements in the source element list comprises:
responsive to determining the element is represented by a first root node in the destination element list, copying child elements of the element to the destination element list as child nodes of the first root node;
responsive to determining that a parent node of the element is represented by a second root node in the destination element list, copying the element to the destination element list as a child node of the second root node; and
responsive to determining the element is a root element, copying the element to the destination element list as a root node.

19. A computer program product stored on a non-transitory computer readable medium, the computer program product having computer executable code for causing a processor to execute a method, the computer executable code comprising:
code for establishing a source hierarchical target and a destination hierarchical target;
code for receiving a plurality of changes of one or more source elements of the source hierarchical target;
code for traversing elements of a source element list, the source element list comprising the one or more source elements of the source hierarchical target, and, for each source element, determining hierarchy child attributes of the element;
code for copying the elements of the source element list to a destination element list in accordance with the hierarchy child attributes;
code for propagating a first set of changes of the plurality of changes to a first set of elements of the destination hierarchical target, the first set of elements represented in the destination element list, and the propagating according to a sort order of changes to the first set of elements, the sort order based on hierarchical depths of the first set of elements in the destination element list, and
code for propagating a second set of changes the plurality of changes to a second set of elements represented in the destination hierarchical target, the propagating according to a non-hierarchical order of the second set of elements in the destination element list.

20. The computer program product of claim 19, wherein the code for propagating the changes of the source hierarchical target to respective elements of a destination hierarchical target comprises:
code for propagating a first set of the plurality of changes to respective elements of the destination hierarchical target based upon the hierarchical depth order of the elements of the source hierarchical target; and
code for propagating a second set of the plurality of changes to respective elements of the destination hierarchical target after the first set of element changes are propagated.

21. The computer program product of claim 20, further comprising:
code for determining the hierarchical depth order of elements of the source hierarchical target using hierarchy child attributes stored in association with elements of the source hierarchical target.

22. The computer program product of claim 21, wherein the hierarchy child attributes comprise information with respect to a parent element of an element the attribute is stored in association with.

23. The computer program product of claim 21, wherein the code for determining comprises:
code for iteratively deriving the hierarchical depth order of the elements through reference to the hierarchy child attributes.

24. The computer program product of claim 23, wherein the code for iteratively deriving comprises:
code for creating the source element list initially containing all elements of the source hierarchical target;
code for creating the destination element list initially containing no elements of the source hierarchical target; and
code for adding elements to the destination element list from the source element list in accordance with the hierarchy child attributes.

25. The computer program product of claim 24, wherein the code for iteratively deriving further comprises:
code for replacing the source element list with the destination element list and emptying the destination element list of all elements prior to initiating a next iteration of the iteratively deriving.

26. The computer program product of claim 20, wherein the propagating the first set of element changes based upon the hierarchical depth order of elements propagates the element changes in ascending hierarchical order.

27. The computer program product of claim 20, wherein the first set of element changes comprise adding an element, changing an element, and moving an element within a hierarchical data structure, and wherein the second set of element changes comprise deleting an element.

28. A system comprising:
a non-transitory computer-readable medium; and
a processor in communication with the non-transitory computer-readable medium, the processor configured to:
establish a source hierarchical target and a destination hierarchical target;
receive a plurality of changes of one or more source elements of a source hierarchical target;

traverse elements of a source element list, the source element list comprising the one or more source elements of the source hierarchical target, and, for each source element, determine hierarchy child attributes of the element;

copy the elements of the source element list to a destination element list in accordance with the hierarchy child attributes propagate a first set of changes of the plurality of changes to a first set of elements of the destination hierarchical target, the first set of elements represented in the destination element list, and the propagating according to a sort order of changes to the first set of elements, the sort order based on hierarchical depths of the first set of elements in the destination element list, and propagate a second set of changes of the plurality of changes to a second set of elements represented in the destination hierarchical target, the propagating according to a non-hierarchical order of the second set of elements in the destination element list.

29. The system of claim 28, wherein the hierarchical depth order of elements of the source hierarchical target comprises a tree and node hierarchical data structure.

30. The system of claim 28, wherein the propagating the first set of element changes in order of the hierarchical depth order of elements propagates the element changes in ascending hierarchical order.

31. The system of claim 28, wherein the first set of element changes comprise adding an element, changing an element, or moving an element within the source hierarchical target, and wherein the second set of element changes comprise deleting an element from the source hierarchical target.

32. The system of claim 28, wherein the propagating the second set of element changes separate from the first set of element changes comprises propagating the second set of element changes after propagating the first set of element changes.

33. The system of claim 28, wherein the processor is further configured to:

maintain a change log having information regarding the plurality of changes made to elements of the source hierarchical target.

* * * * *